United States Patent
Choi et al.

(10) Patent No.: US 9,277,512 B2
(45) Date of Patent: Mar. 1, 2016

(54) METHOD AND APPARATUS FOR DISTRIBUTED TRANSMISSION POWER CONTROL IN WIRELESS NETWORKS

(75) Inventors: Hyun Ho Choi, Suwon-si (KR); Chang Yong Shin, Seoul (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 542 days.

(21) Appl. No.: 13/169,004

(22) Filed: Jun. 26, 2011

(65) Prior Publication Data

US 2012/0149425 A1 Jun. 14, 2012

(30) Foreign Application Priority Data

Dec. 8, 2010 (KR) ........................ 10-2010-0124856

(51) Int. Cl.
*H04B 7/00* (2006.01)
*H04B 7/14* (2006.01)
*H04W 52/40* (2009.01)
*H04W 52/14* (2009.01)

(52) U.S. Cl.
CPC ............ *H04W 52/40* (2013.01); *H04W 52/143* (2013.01)

(58) Field of Classification Search
CPC .............. H04W 52/143; H04W 52/40; H04W 52/0229; H04W 52/04; H04W 52/08; H04W 52/10; H04W 52/16; H04W 52/226; H04W 52/228; H04W 52/247; H04W 52/26; H04W 52/265; H04W 52/281; H04W 52/34
USPC ..................................................... 455/522, 7
See application file for complete search history.

(56) References Cited

U.S. PATENT DOCUMENTS

| 5,319,638 | A | * | 6/1994 | Lin ............................... 370/235 |
| 6,996,368 | B2 | | 2/2006 | Orlik et al. |
| 2009/0017752 | A1 | | 1/2009 | Lee |
| 2009/0017861 | A1 | * | 1/2009 | Wu et al. ....................... 455/522 |
| 2010/0009710 | A1 | | 1/2010 | Zhang et al. |
| 2010/0061480 | A1 | * | 3/2010 | Kashiwase et al. ........... 375/295 |

(Continued)

FOREIGN PATENT DOCUMENTS

| CN | 1319282 A | 10/2001 |
| CN | 101841883 A | 9/2010 |

(Continued)

OTHER PUBLICATIONS

International Search Report issued Apr. 24, 2012 in counterpart International Application No. PCT/KR2011/007811 (3 pages, in English).

(Continued)

*Primary Examiner* — Ping Hsieh
*Assistant Examiner* — Xin Jia
(74) *Attorney, Agent, or Firm* — NSIP Law

(57) ABSTRACT

Provided is a method and apparatus for distributed transmission power control in a wireless network. The method and apparatus for distributed transmission power control may substantially maximize a minimum value of a transmission rate of each transmitter by controlling a transmission power of each transmitter. The transmission power may be controlled so that transmission rates of transmitters are substantially identical to each other. If the transmission rate is less than a requested transmission rate, the method and apparatus may change a resource of a transmitter that uses a substantially maximum power.

17 Claims, 11 Drawing Sheets

(56) References Cited

U.S. PATENT DOCUMENTS

| | | | |
|---|---|---|---|
| 2010/0131670 A1* | 5/2010 | Ishii et al. | 709/233 |
| 2010/0135236 A1* | 6/2010 | Wang et al. | 370/329 |
| 2010/0238883 A1 | 9/2010 | Borran et al. | |
| 2010/0238885 A1 | 9/2010 | Borran et al. | |
| 2011/0077041 A1* | 3/2011 | Kwon et al. | 455/509 |
| 2011/0223952 A1* | 9/2011 | Nanda et al. | 455/509 |
| 2012/0188894 A1* | 7/2012 | Huschke et al. | 370/252 |

FOREIGN PATENT DOCUMENTS

| | | |
|---|---|---|
| JP | 07-143090 | 6/1995 |
| JP | 08-265832 | 10/1996 |
| JP | 2002-171215 | 6/2002 |
| JP | 2006-197249 A | 7/2006 |
| JP | 4402170 B2 | 1/2010 |
| JP | 2010-141886 A | 6/2010 |
| JP | 2010-533445 A | 10/2010 |
| KR | 10-2003-0057467 | 7/2003 |
| KR | 10-2006-0132479 | 12/2006 |
| KR | 10-2008-0040545 | 5/2008 |
| KR | 10-2009-0041048 | 4/2009 |

OTHER PUBLICATIONS

Japanese Office Action issued on Feb. 3, 2015 for the corresponding Japanese Patent Application No. 2013-543089 (English translation pp. 1-2; Japanese Office Action pp. 3-5).

Chinese Office Action issued Jan. 4, 2016 in corresponding Chinese Patent Application No. 201180055998.X (6 Pages, in Chinese).

European Search Report issued Nov. 6, 2015 in counterpart European Application No. 11846943.6 (5 page in English).

* cited by examiner

METHOD AND APPARATUS FOR DISTRIBUTED TRANSMISSION POWER CONTROL IN WIRELESS NETWORKS

CROSS-REFERENCE TO RELATED APPLICATION(S)

This application claims the benefit under 35 U.S.C. §119(a) of Korean Patent Application No. 10-2010-0124856, filed on Dec. 8, 2010, in the Korean Intellectual Property Office, the entire disclosure of which is incorporated herein by reference for all purposes.

BACKGROUND

1. Field

The following description relates to a method and apparatus for performing a distributed transmission power control in a wireless network. More particularly, examples are directed to a method and apparatus for controlling a transmission power of a transmitter in a cellular communication system and a multi-hop communication system.

2. Description of Related Art

A cellular communication system may include a plurality of cells adjacent to each other. A base station located at a center of each cell may communicate with a terminal located at a predetermined position within a corresponding cell. Each base station may determine a transmission power based on a status of a channel to a corresponding terminal, and the transmission power may be increased to enhance a transmission rate with respect to the corresponding terminal. However, a signal transmitted by each base station may interfere with a terminal in a neighboring cell.

In a multi-hop communication system, data may be transmitted from a source node to a destination node through a plurality of relay nodes. Each link in a multi-hop communication system may include a single transmission node and a single reception node, and a transmission node may control a transmission power based on a channel status of a corresponding link while transmitting data to a corresponding reception node. Since a plurality of transmission nodes may simultaneously transmit data, a signal of each transmission node may interfere with a reception node of a neighboring link.

SUMMARY

In one general aspect, there is provided a communication method of a target transmitter, the method including calculating a target metric based on a weight of the target transmitter and a transmission rate of the target transmitter, transmitting the target metric to at least one neighboring transmitter and at least one neighboring receiver, and determining a transmission power, for a subsequent transmission period of the target transmitter, based on a transmission rate, for the subsequent transmission period of the target transmitter, wherein the transmission rate of the target transmitter is calculated based on information associated with a channel from the target transmitter to a target receiver.

The determining may include determining the transmission power, for the subsequent transmission period of the target transmitter, to be substantially the same as a transmission power, for a current transmission period of the target transmitter, if an absolute value of a difference between the transmission rate, for the subsequent transmission period of the target transmitter, and the target metric is less than a predetermined threshold.

The determining may include determining the transmission power, for the subsequent transmission period of the target transmitter, based on the transmission rate, for the subsequent transmission period of the target transmitter, if an absolute value of a difference between the transmission rate, for the subsequent transmission period of the target transmitter, and the target metric is greater than or equal to a predetermined threshold.

The method may further include calculating the transmission rate for the subsequent transmission period of the target transmitter, based on the weight of the target transmitter and based on an average of the target metric and a neighbor metric, wherein the neighbor metric is determined with respect to each transmission rate of the at least one neighboring transmitter.

The weight of the target transmitter may be predetermined based on a status of a connection between the target transmitter and the at least one neighboring transmitter, or based on a value representing a relative importance of a transmission rate between the target transmitter and the target receiver.

The transmitting may include transmitting the target metric to the at least one neighboring transmitter through a wired backhaul connected to the at least one neighboring transmitter.

The transmitting may include broadcasting the target metric to the at least one neighboring receiver using a radio resource of the target transmitter.

The method may further include receiving the neighbor metric from the at least one neighboring transmitter and the target receiver.

The determining may include assigning a radio resource, other than a radio resource of a current transmission period, for the subsequent transmission period, if an absolute value of a difference between the transmission rate for the subsequent transmission period of the target transmitter and the target metric is less than a predetermined threshold, if the transmission rate for the subsequent transmission period of the target transmitter is less than a requested predetermined transmission rate, and if the target transmitter uses a substantially maximum transmission power at a current transmission period.

When the target transmitter corresponds to a relay node of a multi-hop communication system, the at least one neighboring transmitter and the at least one neighboring receiver may correspond to at least one relay node adjacent to the target transmitter.

In another general aspect, there is provided a communication method of a target receiver corresponding to a target transmitter, the method including receiving a neighbor metric, with respect to each transmission rate of at least one neighboring transmitter, from the at least one neighboring transmitter, determining a transmission power, for a subsequent transmission period of the target transmitter, based on a transmission rate for the subsequent transmission period of the target transmitter, and transmitting, to the target transmitter, information regarding the transmission power for the subsequent transmission period of the target transmitter.

The method may further include calculating a transmission rate of the target transmitter based on the information associated with a channel from the target transmitter to a target receiver, calculating a target metric based on the transmission rate of the target transmitter and a weight of the target transmitter, and transmitting the target metric to the target transmitter.

The determining may include determining the transmission power, for the subsequent transmission period of the target transmitter, to be substantially the same as a transmission power, for a current transmission period of the target transmitter, if an absolute value of a difference between the transmission rate, for the subsequent transmission period of the target transmitter, and a target metric, with respect to the transmission rate of the target transmitter, is less than a predetermined threshold.

The determining may include determining the transmission power, for the subsequent transmission period of the target transmitter, based on the transmission rate for the subsequent transmission period of the target transmitter, if an absolute value of a difference between the transmission rate, for the subsequent transmission period of the target transmitter, and a target metric, with respect to the transmission rate of the target transmitter, is greater than or equal to a predetermined threshold.

The method may further include calculating the transmission rate for the subsequent transmission period of the target transmitter, based on a weight of the target transmitter and based on an average of a target metric with respect to the transmission rate of the target transmitter and the neighbor metric.

In still another general aspect, there is provided a target transmitter, including a processor to calculate a target metric based on a weight of the target transmitter and a transmission rate of the target transmitter, and a transmitting unit to transmit the target metric to at least one neighboring transmitter and at least one neighboring receiver, wherein the processor determines a transmission power, for a subsequent transmission period of the target transmitter, based on a transmission rate for the subsequent transmission period of the target transmitter, and the transmission rate of the target transmitter is calculated based on information associated with a channel from the target transmitter to a target receiver.

The processor may determine a transmission power, for the subsequent transmission period of the target transmitter, to be substantially the same as a transmission power, for a current transmission period of the target transmitter, if an absolute value of a difference between the transmission rate, for the subsequent transmission period of the target transmitter, and the target metric is less than a predetermined threshold.

The processor may determine a transmission power, for the subsequent transmission period of the target transmitter, based on the transmission rate for the subsequent transmission period of the target transmitter, if an absolute value of a difference between the transmission rate, for the subsequent transmission period of the target transmitter, and the target metric is greater than or equal to a predetermined threshold.

The target transmitter may further include a receiving unit to receive a neighbor metric from the at least one neighboring transmitter and the target receiver.

If an absolute value of a difference between the transmission rate for the subsequent transmission period of the target transmitter and the target metric is less than a predetermined threshold, if the transmission rate for the subsequent transmission period of the target transmitter is less than a requested predetermined transmission rate, and if the target transmitter uses a substantially maximum transmission power at a current transmission period, the processor may assign a radio resource, other than a radio resource of a current transmission period, for the subsequent transmission period.

The transmission rate for the subsequent transmission period of the target transmitter may be calculated based on the weight of the target transmitter and based on an average of the target metric and a neighbor metric, wherein the neighbor metric is determined with respect to each transmission rate of the at least one neighboring transmitter.

In yet another general aspect, there is provided a method of a cellular communication system that includes a plurality of cells and at least one base station associated with each of the plurality of cells, the method including determining a minimum transmission rate from among transmission rates associated with each of the plurality of cells, and determining a transmission power for each of the plurality of cells that substantially maximizes the minimum transmission rate, wherein the substantially maximized transmission rate is determined with respect to a transmission power of the at least one base station associated with each of the plurality of cells, a Signal to Interference-plus-Noise Ratio (SINR) of each cell, and a noise power of each cell.

The method may further include setting each of the transmission rates associated with each of the plurality of cells to substantially the same value.

If the cellular communication system is a multi-hop communication system, the determining of the minimum transmission rate may further include determining a minimum transmission rate among the transmission rates for each link in a multi-hop path.

A method and apparatus for controlling a distributed transmission power according to one example may substantially maximize a minimum value of transmission rates of transmitters by controlling a transmission power of each transmitter to enable the respective transmission rates of transmitters to be substantially identical to each other. Accordingly, a bottleneck phenomenon may be reduced in an overall system that includes each transmitter. In particular, a transmission rate of a multi-hop communication system may be improved due to the reduction of the bottleneck phenomenon. Since terminals may receive power at substantially the same transmission rate in all cells, a transmission rate of broadcast control information, in each cell, may be substantially maximized.

A method and apparatus for controlling a distributed transmission power according to one example may control each transmission power so that transmission rates of transmitters may be substantially identical to each other. If the transmission rate is less than a requested transmission rate, the method and apparatus may change a resource of a transmitter that uses a substantially maximum power. Thus, a transmission rate of an overall system may be enhanced.

According to one example, since a portion of transmitters may not use a maximum transmission power, an overall system may economically use energy.

A method and apparatus for controlling a distributed transmission power according to one example may use a relatively simple algorithm, thereby reducing a complexity during an implementation, and may provide a control regardless of a number of nodes.

Other features and aspects will be apparent from the following detailed description, the drawings, and the claims.

Figure 1:
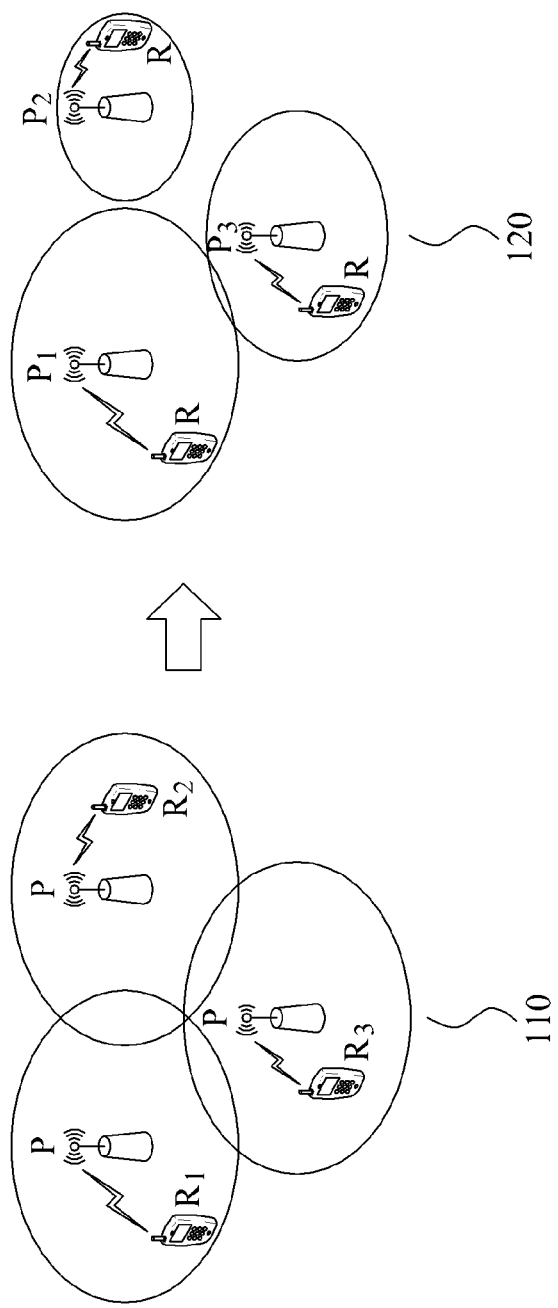
FIG. 1 is a diagram illustrating an example of distributed transmission power control in a multi-cell communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

A signal transmitted by each base station in a cellular communication system may interfere with a terminal in a neighboring cell. Thus, in a view of an overall cellular communication system, it may be inefficient to increase a transmission power of each base station to enhance a transmission rate to a corresponding terminal. Accordingly, a method of obtaining a "fair" transmission rate may be implemented in each cell of an overall cellular communication system.

An example described herein may provide a transmission power control method of each base station such that all cells have substantially the same transmission rate in a view of optimizing an equal adjustment in a cellular communication system. The transmission power control method may be applied to a service, where all cells are requested to have the same transmission rate in the cellular communication system, for example, a transmission of broadcast control information.

Another example described herein may provide a solution to address a max-min fair allocation issue in a cellular communication system that includes a plurality of cells. The max-min fair allocation issue may substantially maximize a minimum value of a transmission rate of each cell, and may be determined according to the following Equation 1:

$$\max_P \left\{ \min_{\forall i} R_i \right\}$$ [Equation 1]

s.t.: $\forall i, 0 \leq p_i \leq p_{max}$ and $$\forall i, R_i \leq \log_2(1 + SINR_i) = \log_2\left(1 + \frac{p_i g_i}{\sum_{\forall j, j \neq i} p_j g_j + N}\right).$$

In Equation 1, $R_i$ denotes a transmission rate of an $i^{th}$ cell, that is, a transmission rate of a base station of the $i^{th}$ cell, and $SINR_i$ denotes a Signal to Interference-plus-Noise Ratio (SINR) of the $i^{th}$ cell. Further, $p_i$ denotes a transmission power of an $i^{th}$ base station, $g_i$ denotes a channel between a base station and a terminal of the $i^{th}$ cell, and N denotes power of noise.

Accordingly, $p_{max}$ denotes a maximum transmission power with respect to $$p_i \cdot \forall i, R_i \leq \log_2(1 + SINR_i) = \log_2\left(1 + \frac{p_i g_i}{\sum_{\forall j, j \neq i} p_j g_j + N}\right)$$

corresponds to the Shannon capacity equation, and denotes a relational expression among $R_i$, $SINR_i$, and $p_i$.

As one example, a method of obtaining $p_i$ of each base station is provided, that is, a set P of transmission powers of each base station that substantially maximize a minimum value of each $R_i$ (min $R_i$) with respect to all cells as shown in Equation 1.

A result of Equation 1 where min $R_i$ is maximized may be obtained by setting each $R_i$ to the same value, that is, R1=R2= . . . =Ri. As another example, a transmission power may be controlled to set each $R_i$ to substantially the same value, and transmission powers may be determined to enable the equally adjusted $R_i$ to be maximized. Thus, all cells may have essentially the same optimized transmission rate.

In a multi-hop communication system, a signal of each transmission node may interfere with a reception node of a neighboring link. Thus, a transmission node may determine a transmission power based on reception nodes in addition to a corresponding reception node.

Accordingly, as a further example, a method of determining a transmission power of each transmission node for substantially maximizing an overall transmission rate between a reception node and a destination node is provided, when data is transmitted from the source node to the destination node based on a hop-by-hop scheme.

As yet another example, a method of substantially maximizing an overall transmission rate of a multi-hop transmission link between a source node and a destination node is provided, in a multi-hop communication system, that is, a multi-hop ad hoc network.

Overall transmission rate C of a multi-hop transmission link including a source node, a plurality of relay nodes, and a destination node may be determined according to a minimum value of each link transmission rate, as the following Equation 2:

$$C = \min(R_1, R_2, \ldots, R_i).$$ [Equation 2]

The source node, the plurality of relay nodes, and the destination node may correspond to a transmission node or a reception node depending on implementation and use.

Maximizing overall transmission rate C of a multi-hop link in a multi-hop communication system may be applied to Equation 1. Thus, in one example, a method of determining a transmission power P of each transmission node that substantially maximizes overall transmission rate C of the multi-hop link is provided. Setting $R_i$ of each link to the same value is one example of a solution that maximizes overall transmission rate C of the multi-hop link.

FIG. 1 illustrates an example of distributed transmission power control in a multi-cell communication system 120.

In a conventional multi-cell communication system 110, since each cell may use the same transmission power P, transmission rates of cells, $R_1$, $R_2$, and $R_3$, may be different from each other.

In the multi-cell communication system 120, according to one example, a transmission power of each cell, that is, a transmission power of each base station, may be determined based on Equation 1 and thus, transmission rates of the cells may be substantially identical to R. In this example, transmission powers of the cells may be different from each other.

Figure 2:
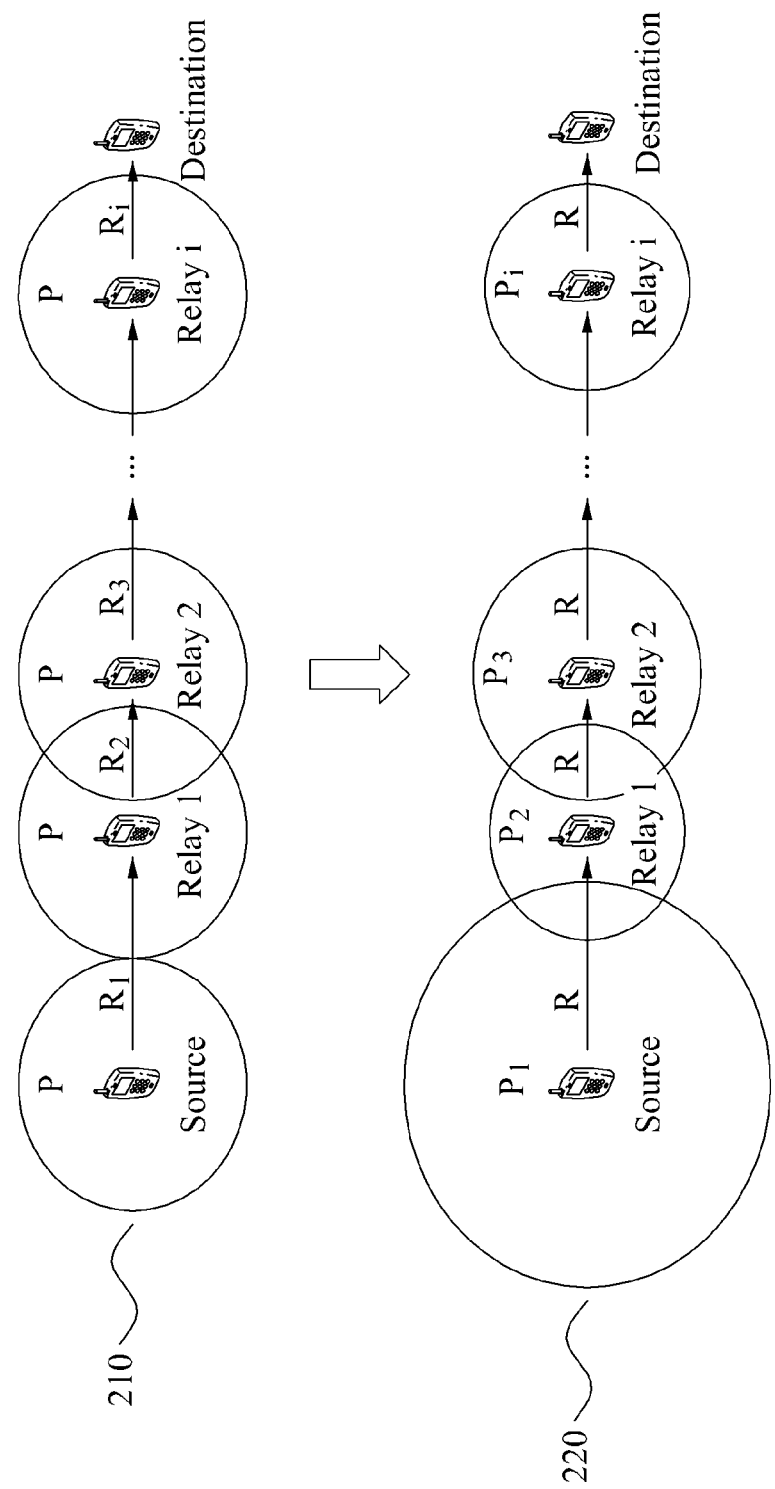
FIG. 2 is a diagram illustrating an example of distributed transmission power control in a multi-hop communication system.

FIG. 2 illustrates an example of distributed transmission power control in a multi-hop communication system 220.

In a conventional multi-hop communication system 210, since each transmission node may use the same transmission power, transmission rates of links $R_1$, $R_2$, $R_3$, ... $R_i$, may be different from each other.

In the multi-hop communication system 220 according to an embodiment, transmission rates of links may be substantially identical to R, and the transmission rate R may correspond to an overall transmission rate of a multi-hop transmission link between a source node and a destination node. Transmission nodes may control transmission powers to obtain substantially the same transmission rate R, respectively.

Hereinafter, a method of performing the distributed transmission power control in a multi-cell communication system and in a multi-hop communication system is further described. The same algorithm may be applied to both the multi-cell communication system and the multi-hop communication system. A base station of the multi-cell communication system may correspond to a transmission node of the multi-hop communication system and thus, the base station may be referred to as a transmitter, for convenience of description. A terminal of the multi-cell communication system may correspond to a reception node of the multi-hop communication system and thus, the terminal may be referred to as a receiver. As described above, a relay node of the multi-hop communication system may correspond to the transmitter or the receiver.

Figure 3:
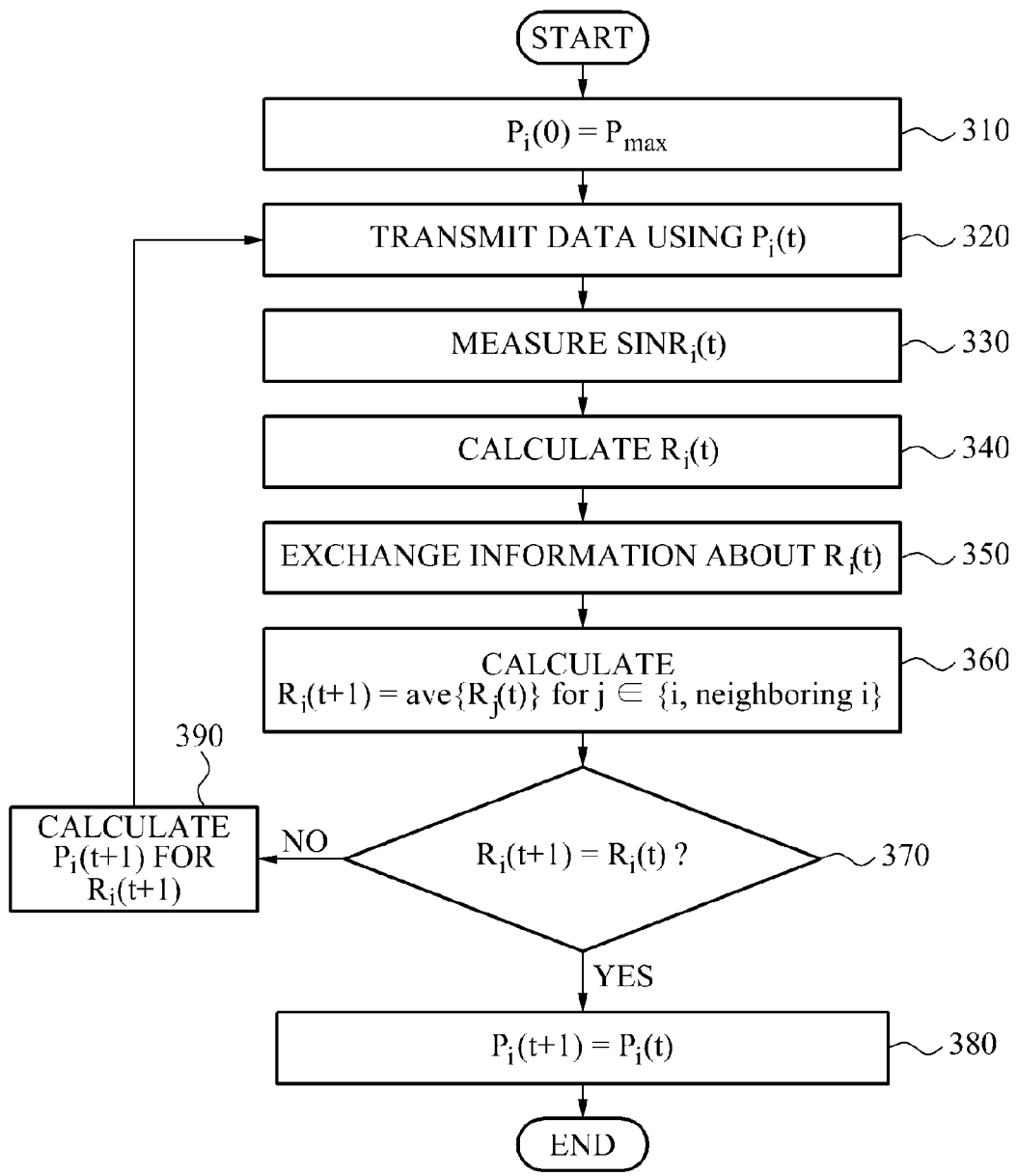
FIG. 3 is a flowchart illustrating an example of a method of controlling a distributed transmission power.

FIG. 3 illustrates a flowchart for an example of a method of controlling a distributed transmission power.

Referring to FIG. 3, a transmitter i may determine an initial transmission power $p_i(0)$. In operation 310, the initial transmission power $p_i(0)$ may be determined as the maximum transmission power $p_{max}$ that may be used by the transmitter i.

In operation 320, the transmitter i may determine a transmission power with respect to a time t, and may transmit data to a receiver i corresponding to the transmitter i.

In an operation 330, the receiver i may receive a signal from the transmitter i at time t, and may measure an $SINR_i(t)$. The receiver i may feed back information regarding the $SINR_i(t)$ to the transmitter i.

In operation 340, the transmitter i may calculate a transmission rate $R_i(t)$ of the transmitter i with respect to time t, based on the fed back information associated with the $SINR_i(t)$. Here, a transmission rate $R_i(t)$ is referred to as $R_i(t)$ for convenience of description. Equation 1 may be applied to calculate $R_i(t)$. Also, $R_i(t)$ may be determined based on $R_i = \log_2(1 + SINR_i)$.

In operation 350, the transmitter i may exchange information about $R_i(t)$ or $SINR_i(t)$ with neighboring transmitters. In a cellular communication system, the information about $R_i(t)$ or $SINR_i(t)$ may be shared, for example, through a wired backhaul connected between transmitters. The transmitter i may use a radio resource of the transmitter i to broadcast the information about $R_i(t)$ or $SINR_i(t)$ to neighboring receivers. Each of the neighboring receivers may receive information about $R_i(t)$ or $SINR_i(t)$ to transfer to a corresponding transmitter.

In operation 360, when the transmitter i acquires information regarding each transmission rate of neighboring transmitters $R_{neighboring\ i(\neq i)}(t)$, a transmission rate $R_i(t+1)$ for a subsequent transmission period t+1 may be calculated. Here, the transmission rate $R_i(t+1)$ is referred to as $R_i(t+1)$ for convenience of description. $R_i(t+1)$ may correspond to an average of transmission rates of neighboring transmitters recognized by the transmitter i, and may be calculated according to the following Equation 3:

$$R_i(t+1) = \frac{\lambda}{N} \sum_{j=1}^{N} R_j. \quad \text{[Equation 3]}$$

In Equation 3, j denotes an index with respect to the transmitter i and the neighboring transmitters, and N denotes a number of the transmitters used for calculating the average of transmission rates. Here, $\lambda$ denotes a factor for controlling a convergence rate of a transmission rate, and may have a value between "0" and "1". The value of $\lambda$ may be appropriately set according to system implementation and desired parameters.

In operation 370, the transmitter i may compare $R_i(t+1)$ with $R_i(t)$. If $R_i(t+1)$ is substantially the same as $R_i(t)$, the transmitter i may use a transmission power of a current transmission period, that is, $p_i(t)$, at a subsequent period in operation 380. Here, $p_i(t)$ may be selected as a result of the distributed transmission power control. Thus, the distributed transmission power control may be completed, and the transmitter i may transmit data using $p_i(t)$.

When $R_i(t+1)$ is different from $R_i(t)$, the transmitter i may calculate $p_i(t+1)$ based on $R_i(t+1)$ in operation 390. That is, equation 1 may be used for calculating $p_i(t+1)$. In particular, $p_i(t+1)$ may be calculated according to Equation 4, which corresponds to an inverse function of Equation 1:

$$p_i = \frac{(2^{R_i} - 1) \cdot \left( \sum_{\forall j, j \neq i} p_j g_j + N \right)}{g_i}. \quad \text{[Equation 4]}$$

The transmitter i may return to operation 320 with $p_i(t+1)$.

In operation 370, instead of determining whether $R_i(t+1)$ is substantially identical to $R_i(t)$, a determination may be made with respect to whether an absolute value of a difference between $R_i(t+1)$ and $R_i(t)$ is less than a predetermined threshold, or is greater than or equal to the predetermined threshold.

In operation 350, if the receiver i is able to determine $R_{neighboring\ i}(t)$ or $SINR_{neighboring\ i}(t)$ by overhearing broadcast information of neighboring transmitters, the receiver i may perform operation 340, operation 360, and operation 370, and the receiver i may feed back a finally determined $p_i(t+1)$ to the transmitter i.

Figure 4:
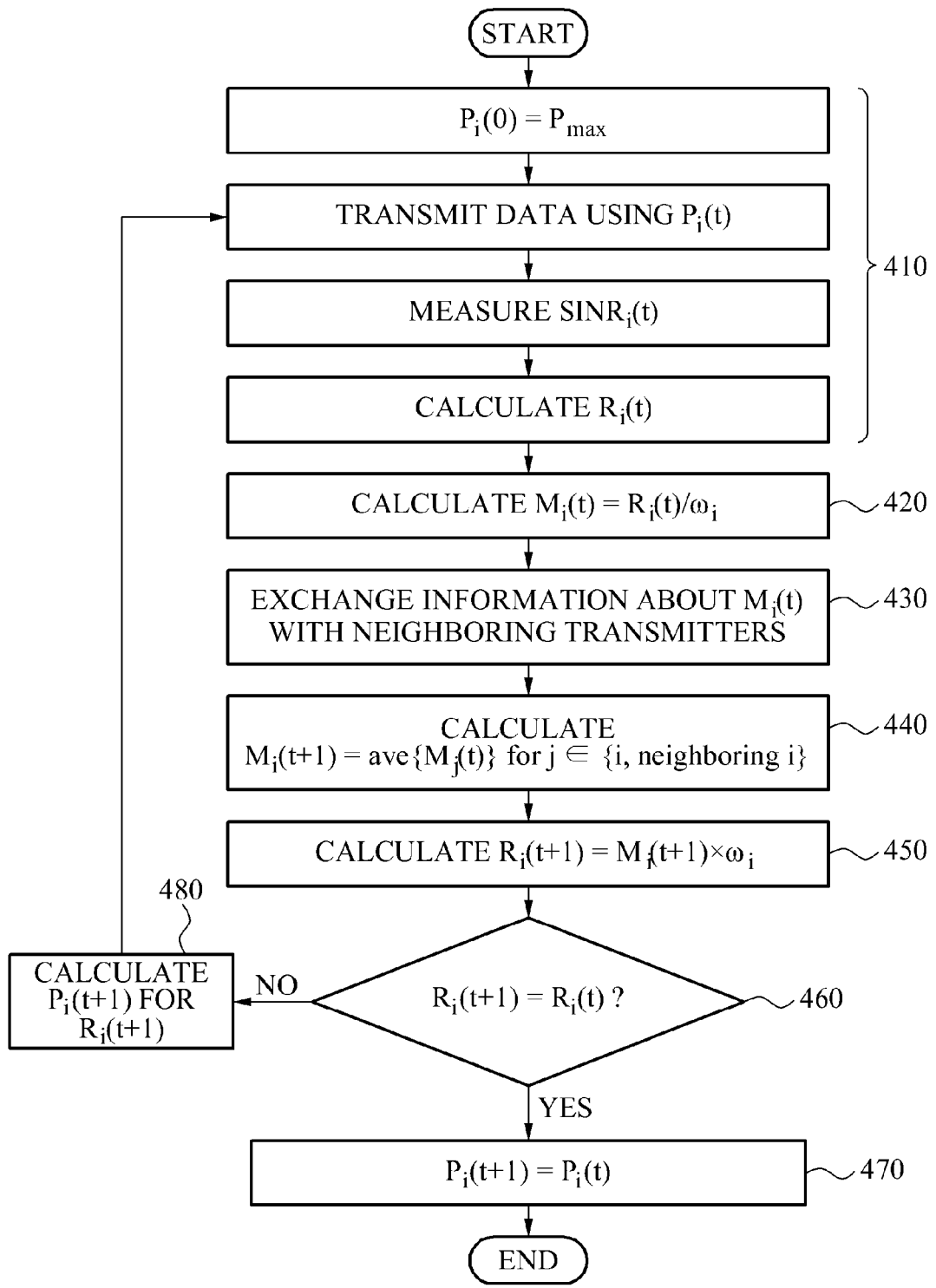
FIG. 4 is a flowchart illustrating an example of a method of controlling a distributed transmission power based on a weight.

FIG. 4 illustrates a flowchart for an example of a method of controlling a distributed transmission power based on a weight.

FIG. 4 illustrates a modified algorithm of the distributed transmission power control described with reference to FIG. 3. Accordingly, FIG. 4 illustrates an operational flow of a method of weighting a transmission rate of each transmitter and transferring a final transmission rate of transmitters in proportion to a weight.

For example, in a multi-hop communication system, when requested transmission rates of a node A and a node B respectively correspond to x, a requested transmission rate of a node C that receives data from both node A and node B may correspond to 2x. Further, if a weight of node A and node B is determined to be w, a weight of node C may be determined to be 2w. Accordingly, a weight may be determined to be proportional to a requested transmission rate.

A value of the weight may be initially determined. If the weight is determined to be proportional to an initial transmission rate based on a proportional fair scheme, the weight may be determined to be $\omega_i = \log(R_i(0))$. Further, the weight may be determined based on various schemes.

Operation 410 is similar to descriptions with reference to FIG. 3, and a description of operation 410 will be omitted. Hereinafter, repeated descriptions of operations similar to those already described will be omitted for clarity and conciseness.

In operation 420, the transmitter i may calculate $M_i(t)$, a metric with respect to a transmission rate of the transmitter i, by dividing a calculated $R_i(t)$ by a weight $w_i$ of the transmitter i.

In operation 430, the transmitter i may exchange $M_i(t)$ with neighboring transmitters, with respect to a transmission rate of the transmitter i. In a cellular communication system, $M_i(t)$ may be shared, for example, through a wired backhaul connected between transmitters. The transmitter i may use a radio resource of the transmitter i broadcast $M_i(t)$ to neighboring receivers. Each of the neighboring receivers may receive information about $M_i(t)$ to transfer to a corresponding transmitter.

In operation 440, when the transmitter i acquires information regarding metrics $M_{neighboring\ i(\neq i)}(t)$ with respect to transmission rates of neighboring transmitters, $M_i(t+1)$ may be calculated. Here, $M_i(t+1)$ indicates a metric with respect to a transmission rate for a subsequent transmission period t+1, of the transmitter i. Further, $M_i(t+1)$ may correspond to an average of the metrics with respect to the transmission rates of the neighboring transmitters recognized by the transmitter i, and may be calculated according to the following Equation 5:

$$M_i(t+1) = \frac{\lambda}{N} \sum_{j=1}^{N} M_j.$$ [Equation 5]

In operation 450, the transmitter i may calculate $R_i(t+1)$ by multiplying a weight $w_i$ by $M_i(t+1)$.

Operation 460, operation 470, and operation 480 are similar to descriptions with reference to FIG. 3, and descriptions of operation 460, operation 470, and operation 480 will be omitted.

Figure 5:
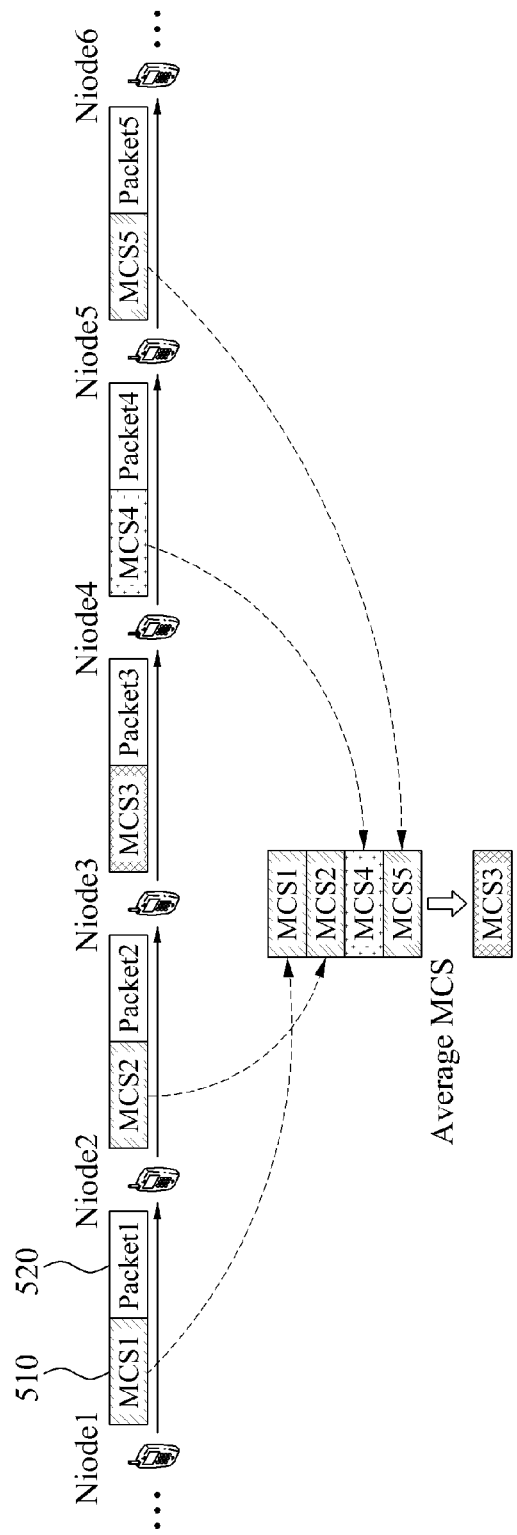
FIG. 5 is a diagram illustrating an example of exchanging information regarding a transmission rate in a multi-hop communication system.

FIG. 5 illustrates an example of exchanging information regarding a transmission rate in a multi-hop communication system.

According to an example, each node may use information regarding a transmission rate of a neighboring cell or a neighboring node. Here, the transmission rate may be substituted with various values such as a Modulation & Coding Set (MCS) level, Channel Quality Information (CQI), a signal to noise ratio (SNR), a signal to interference-plus-noise ratio (SINR), and the like. In the following descriptions, the transmission rate may be applied to a concept that includes one or more of these various values. Further, the transmission rate may be substituted with a metric with respect to the transmission rate.

Since information regarding a transmission rate may be difficult to be expressed by a real number, in a system such as a wireless local area network (WLAN), an MCS value may be used instead of the transmission rate. The MCS value may correspond to the MCS level mapped to an actual transmission rate in a one-to-one function.

Information regarding the MCS level may be transmitted with packet data to report a Modulation & Coding level of packet data 520. As illustrated in FIG. 5, each node may transmit, in a packet header 510, a packet that includes an MCS level corresponding to a transmission rate of the packet as broadcast control information. Thus, neighboring nodes may acquire information regarding the MCS level by overhearing packets of nodes adjacent to nodes in relatively close proximity.

For example, a node 3 may recognize MCS levels included in packets transmitted by nodes in relatively close proximity, and may determine an average of the MCS levels as an MCS value of the node 3.

A target node in the multi-hop communication system may acquire information regarding a transmission rate by overhearing packets transmitted by nodes and reading MCS levels included in the packets.

In a cellular communication system, a base station or a terminal may acquire information regarding a transmission rate by reading MCS levels of packets received from a base station in a neighboring cell. In a cellular communication system, each base station may be connected through a backhaul and thus, the information regarding a transmission rate may be directly exchanged between base stations.

Figure 6:
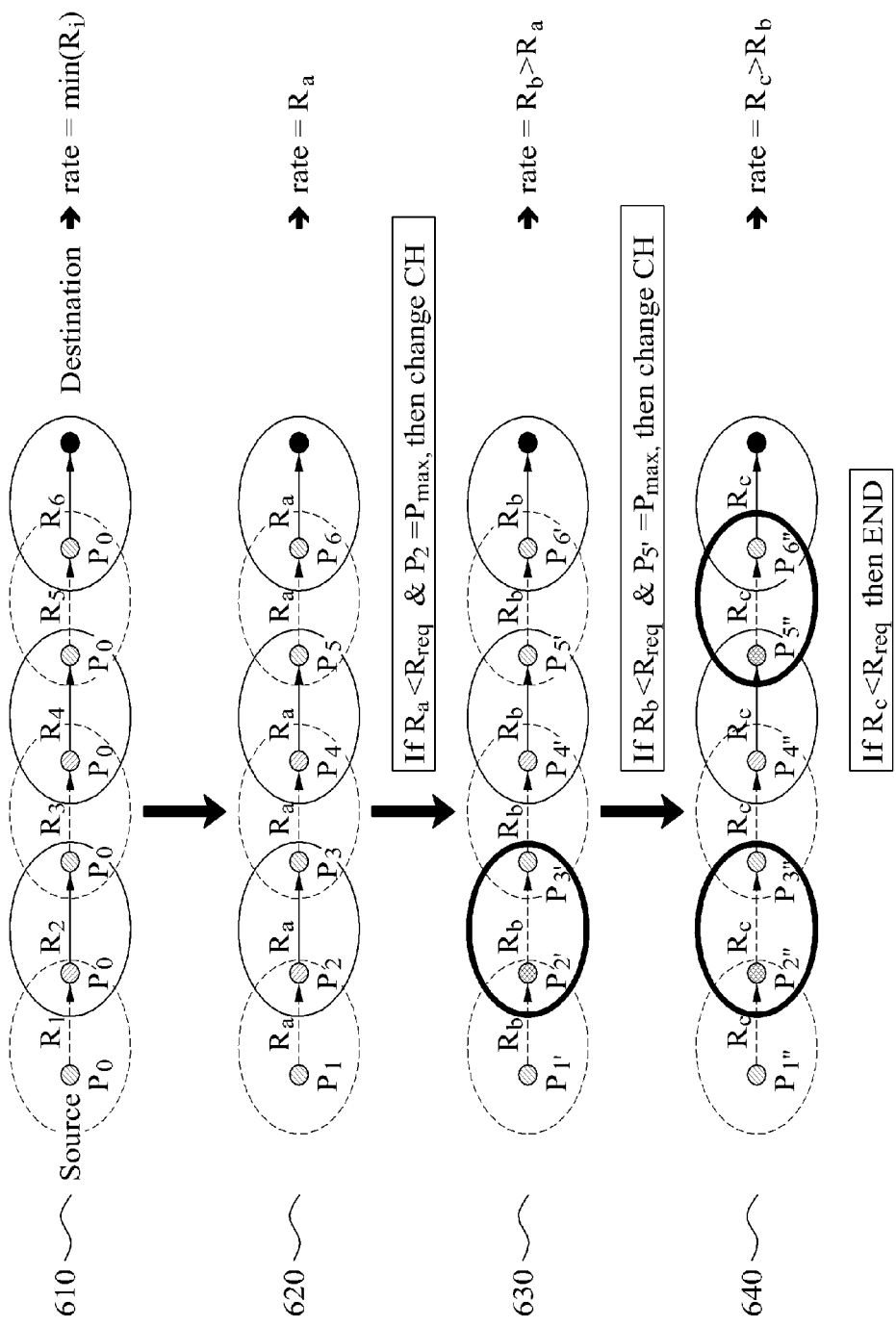
FIG. 6 is a diagram illustrating an example of a method of assigning a distributed resource based on a distributed transmission power control in a multi-hop communication system.

FIG. 6 illustrates an example of a method of assigning a distributed resource based on a distributed transmission power control in a multi-hop communication system.

Referring to FIG. 6, the method of assigning a distributed resource may be incorporated with the method of controlling a distributed transmission power as described herein, and may be used with the method of controlling a distributed transmission power. When an additional resource is assigned, a transmission rate of a link may be enhanced to be a desired transmission rate.

Different frequency resources or different time resources may be initially assigned to adjacent links so that resources used by the adjacent links do not overlap each other. Since essentially the same transmission power may be initially used for each link under a condition of assigning different resources, transmission rates of the links may be different from each other. Accordingly, a transmission rate of an overall link may correspond to a minimum of the transmission rates of the links in operation 610.

In operation 620, by applying a distributed transmission power control, a transmission power may be controlled such that the transmission rates of the link are substantially identical to $R_a$. However, if $R_a$ of the overall link is lower than a requested transmission rate, an additional resource may be assigned.

A link where an additional resource is to be assigned may correspond to a link including a node using a maximum transmission power. An additional frequency resource or an additional time resource may be assigned to a node that uses a maximum transmission power (for example, due to interference), thereby enhancing a transmission rate. FIG. 6 illustrates that a second link corresponds to a poorest link, that is, $p_2 = p_{max}$, and that a frequency resource of the second link is changed.

In operation 630, after the frequency resource is changed, a transmission rate $R_b$ may be obtained, where $R_b$ indicates a transmission rate newly converged through the distributed transmission power control. Here, $R_b$ may be greater than $R_a$.

If $R_b$ is less than a requested transmission rate $R_{req}$, an additional resource may be assigned. When a fifth link uses the maximum transmission power, a resource of the fifth link may be changed. In operation 640, a transmission rate $R_c$ may be obtained, where $R_c$ indicates a transmission rate newly converged through the distributed transmission power control. If $R_c$ is greater than $R_{req}$, operations of controlling a distributed transmission power and assigning a distributed resource may be completed.

Operations of assigning a distributed resource and controlling a distributed transmission power may be repeatedly performed until a transmission rate converged through the distributed transmission power control satisfies a requested transmission rate.

Figure 7:
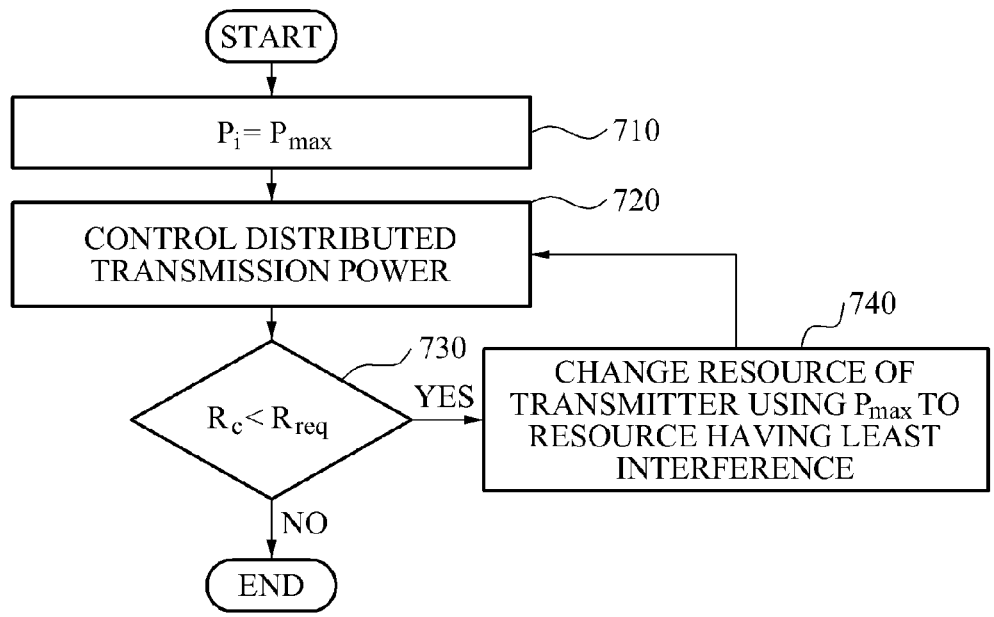
FIG. 7 is a flowchart illustrating an example of a method of assigning a distributed resource based on a distributed transmission power control in a multi-hop communication system.

FIG. 7 illustrates a flowchart for an example of a method of assigning a distributed resource based on a distributed transmission power control in a multi-hop communication system.

Referring to FIG. 7, in an assigned resource area, an initial transmission power may be determined in operation 710, and a distributed transmission power control may be performed in operation 720. Description of operation 710 and operation 720 are similar to operations described with reference to FIG. 3 and FIG. 4, and repeated descriptions will be omitted for clarity and conciseness.

In operation 730, it may be determined whether a converged transmission rate satisfies a requested transmission rate. In operation 740, if the converged transmission rate does not satisfy the requested transmission rate, a transmitter using a maximum transmission power may change a frequency or time resource. Here, a changed frequency resource or time resource may indicate to a resource having a lowest rate of use, that is, a resource where a least amount of interference occurs from among available resources. Operation 740 may be followed by operation 720 where the distributed transmission power control may be performed in a changed frequency resource or time resource area.

When a converged transmission rate satisfies the requested transmission rate, an algorithm as described herein may be completed.

Figure 8:
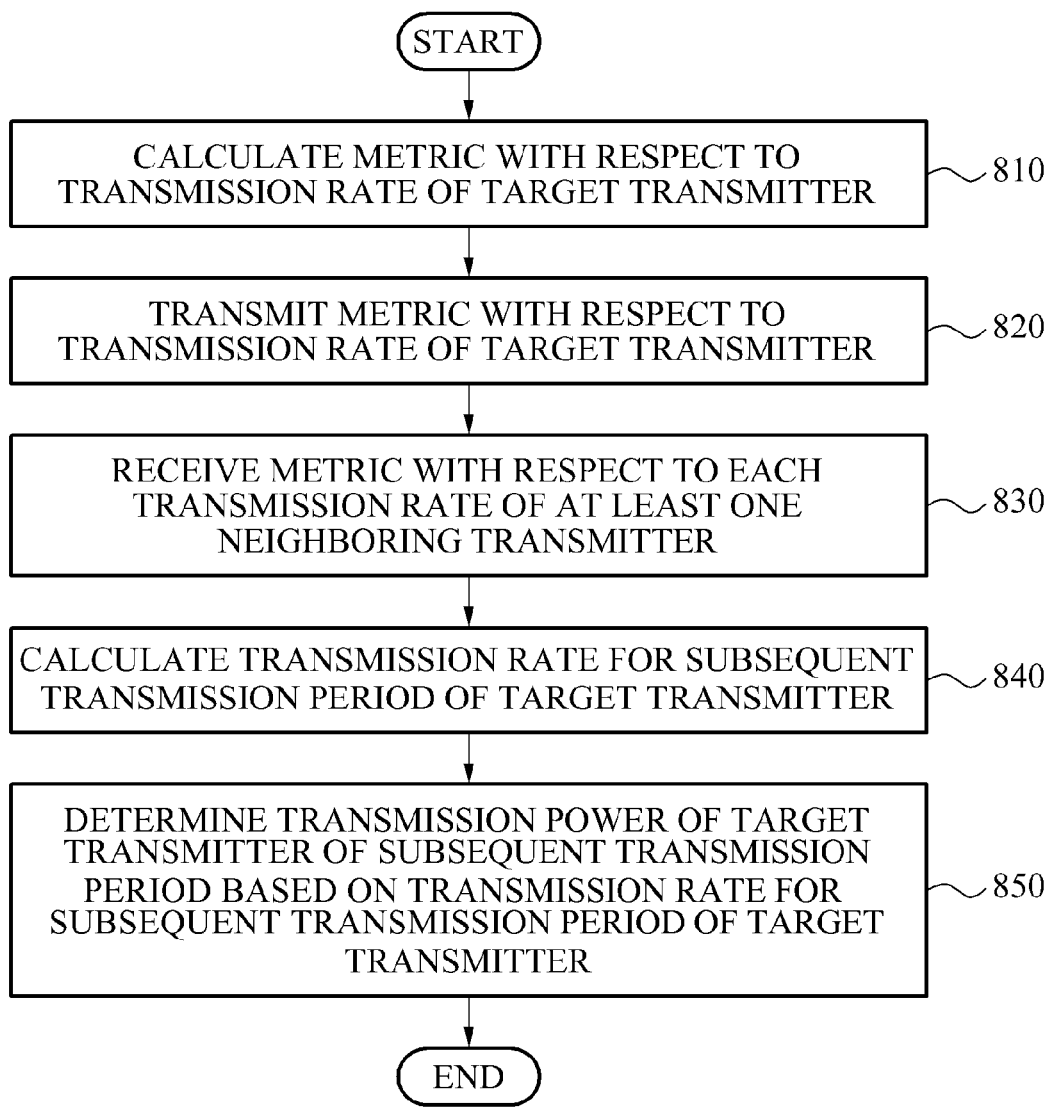
FIG. 8 is a flowchart illustrating an example of a communication method of a target transmitter applying distributed transmission power control.

FIG. 8 illustrates a flowchart for an example of a communication method of a target transmitter applying distributed transmission power control.

Referring to FIG. 8, in operation 810, the target transmitter according to one example may calculate a metric with respect to a transmission rate of the target transmitter, i.e. a target metric, based on a weight of the target transmitter and the transmission rate of the target transmitter. The transmission rate of the target transmitter may be calculated based on information associated with a channel from the target transmitter to a target receiver. Also, the weight of the target transmitter may be predetermined based on a status of a connection between the target transmitter and at least one neighboring transmitter, or may be based on a value representing a relative importance of a transmission rate between the target transmitter and the target receiver.

In operation 820, the target transmitter may transmit the metric, with respect to the transmission rate of the target transmitter, to at least one neighboring transmitter and at least one neighboring receiver. Here, as one example, the target transmitter may transmit the metric to the at least one neighboring transmitter through a wired backhaul connected to the at least one neighboring transmitter. As another example, the target transmitter may broadcast the metric to the at least one neighboring receiver using a radio resource of the target transmitter.

In operation 830, the target transmitter may receive the metric, i.e. a neighbor metric, with respect to each transmission rate of the at least one neighboring transmitter, from the at least one neighboring transmitter and the target receiver.

In operation 840, the target transmitter may calculate the transmission rate, for the subsequent transmission period of the target transmitter, based on an average of the metric with respect to the transmission rate of the target transmitter and a metric with respect to each transmission rate of the at least one neighboring transmitter. The transmission rate for the subsequent transmission period of the target transmitter may also be calculated based on the weight of the target transmitter.

In operation 850, the target transmitter may determine a transmission power for the subsequent transmission period of the target transmitter, based on the transmission rate for the subsequent transmission period of the target transmitter. Here, the transmission rate for the subsequent transmission period of the target transmitter may be calculated based on an average of the metric with respect to the transmission rate of the target transmitter and a metric with respect to each transmission rate of the at least one neighboring transmitter. The transmission rate for the subsequent transmission period of the target transmitter may also be calculated based on the weight of the target transmitter.

If an absolute value of a difference between the transmission rate for the subsequent transmission period of the target transmitter and the metric with respect to the transmission rate of the target transmitter is less than a predetermined threshold, the target transmitter may determine the transmission power for the subsequent transmission period of the target transmitter to be substantially the same as a transmission power for a current transmission period of the target transmitter.

If an absolute value of a difference between the transmission rate for the subsequent transmission period of the target transmitter and the metric with respect to the transmission rate of the target transmitter is greater than or equal to a predetermined threshold, the target transmitter may determine the transmission power for the subsequent transmission period of the target transmitter. Here, the transmission power for the subsequent transmission period of the target transmitter may be determined based on the transmission rate for the subsequent transmission period of the target transmitter.

If an absolute value of a difference between the transmission rate for the subsequent transmission period of the target transmitter and the metric with respect to the transmission rate of the target transmitter is less than a predetermined threshold, if the transmission rate for the subsequent transmission period of the target transmitter is less than a requested predetermined transmission rate, and if the target transmitter uses a substantially maximum transmission power for a current transmission period, the target transmitter may assign a radio resource, different from a radio resource of a current transmission period, for the subsequent transmission period.

When the target transmitter corresponds to a relay node of a multi-hop communication system, the at least one neighboring transmitter and the at least one neighboring receiver may correspond to at least one relay node adjacent to the target transmitter.

Figure 9:
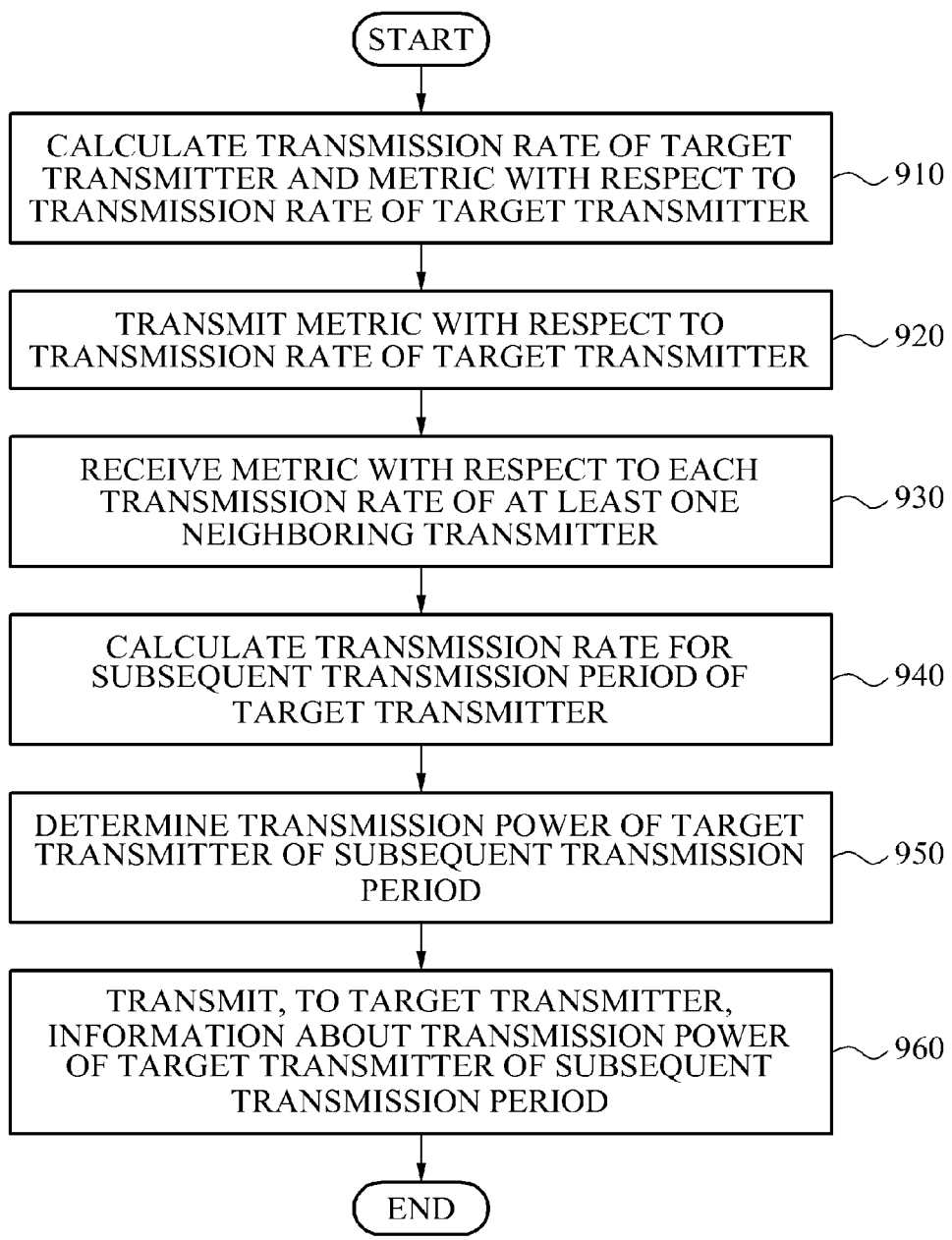
FIG. 9 is a flowchart illustrating an example of a communication method of a target receiver applying distributed transmission power control.

FIG. 9 illustrates a flowchart for an example of a communication method of a target receiver applying distributed transmission power control.

Referring to FIG. 9, in operation 910, the target receiver may calculate a transmission rate of a target transmitter based on information associated with a channel from the target transmitter to the target receiver. Further, the target receiver may calculate a metric with respect to the transmission rate of the target transmitter, based on the transmission rate of the target transmitter and a weight of the target transmitter.

In operation 920, the target receiver may transmit, to the target transmitter, the metric with respect to the transmission rate of the target transmitter.

In operation 930, the target receiver may receive a metric with respect to each transmission rate of at least one neighboring transmitter, from the at least one neighboring transmitter.

In operation 940, the target receiver may calculate a transmission rate for the subsequent transmission period of the target transmitter, based on an average of the metric with respect to the transmission rate of the target transmitter and a metric with respect to each transmission rate of the at least one neighboring transmitter. The transmission rate for the subsequent transmission period of the target transmitter may also be calculated based on the weight of the target transmitter.

In operation 950, the target receiver may determine a transmission power for a subsequent transmission period of the target transmitter, based on the transmission rate for the subsequent transmission period of the target transmitter. Here, the transmission rate for the subsequent transmission period of the target transmitter may be calculated based on an average of a metric with respect to the transmission rate of the target transmitter, and the metric with respect to each transmission rate of the at least one neighboring transmitter. The transmission rate for the subsequent transmission period of the target transmitter may also be calculated based on a weight of the target transmitter. The metric with respect to the transmission rate of the target transmitter may be calculated based on a transmission rate of the target transmitter. The transmission rate of the target transmitter may be calculated based on information associated with a channel from the target transmitter to a target receiver and based on the weight of the target transmitter.

If an absolute value of a difference between the transmission rate for the subsequent transmission period of the target transmitter and the metric with respect to the transmission rate of the target transmitter is less than a predetermined threshold, the target receiver may determine the transmission power for the subsequent transmission period of the target transmitter to be substantially the same as a transmission power for a current transmission period of the target transmitter.

If an absolute value of a difference between the transmission rate for the subsequent transmission period of the target transmitter and the metric with respect to the transmission rate of the target transmitter is greater than or equal to a predetermined threshold, the target receiver may determine the transmission power for the subsequent transmission period of the target transmitter Here, the transmission power for the subsequent transmission period of the target transmitter may be determined based on the transmission rate for the subsequent transmission period of the target transmitter.

In operation 960, the target receiver may transmit, to the target transmitter, information regarding the transmission power for the subsequent transmission period of the target transmitter.

Figure 10:
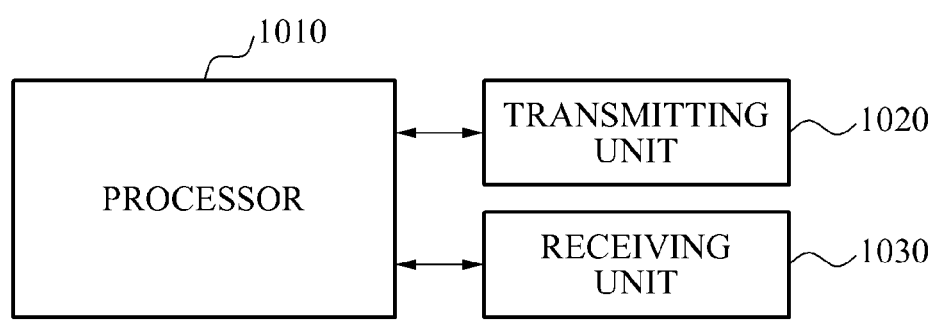
FIG. 10 is a block diagram illustrating an example of a target transmitter applying distributed transmission power control.

FIG. 10 illustrates a flowchart for an example of a target transmitter applying distributed transmission power control.

Referring to the example illustrated in FIG. 10, the target transmitter may include a processor 1010, a transmitting unit 1020, and a receiving unit 1030.

The processor 1010 may calculate a metric with respect to a transmission rate of the target transmitter, based on a weight of the target transmitter and the transmission rate of the target transmitter based on information associated with a channel from the target transmitter to a target receiver. The processor 1010 may determine a transmission power for a subsequent transmission period of the target transmitter, based on a transmission rate for the subsequent transmission period of the target transmitter.

The transmitting unit 1020 may transmit the metric with respect to the transmission rate of the target transmitter to at least one neighboring transmitter and at least one neighboring receiver.

The receiving unit 1030 may receive the metric with respect to each transmission rate of the at least one neighboring transmitter from the at least one neighboring transmitter and the target receiver.

If an absolute value of a difference between the transmission rate for the subsequent transmission period of the target transmitter and the metric with respect to the transmission rate of the target transmitter is less than a predetermined threshold, if the transmission rate for the subsequent transmission period of the target transmitter is less than a requested predetermined transmission rate, and if the target transmitter uses a substantially maximum transmission power for a current transmission period, the processor 1010 may assign a radio resource, different from a radio resource of a current transmission period, for the subsequent transmission period.

Figure 11:
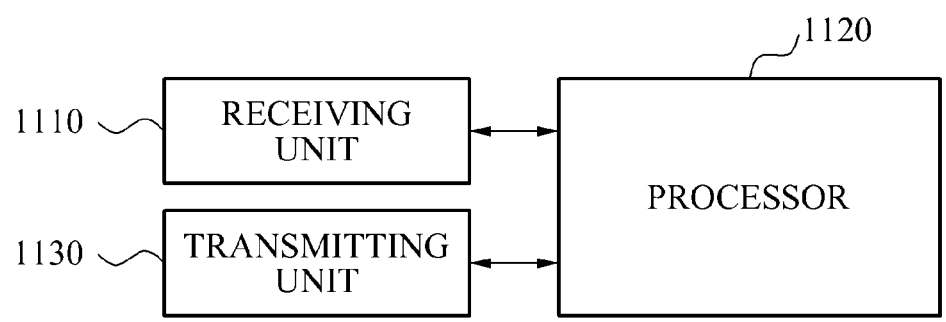
FIG. 11 is a block diagram illustrating an example of a target receiver applying distributed transmission power control.

FIG. 11 illustrates a flowchart for an example of a target receiver applying distributed transmission power control.

Referring to the example illustrated in FIG. 11, the target receiver may include a receiving unit 1110, a processor 1120, and a transmitting unit 1130.

The receiving unit 1110 may receive a metric with respect to each transmission rate of at least one neighboring transmitter from the at least one neighboring transmitter.

The processor 1120 may determine a transmission power for a subsequent transmission period of the target transmitter, based on a transmission rate for the subsequent transmission period of the target transmitter.

The transmitting unit 1130 may transmit, to the target transmitter, information regarding the transmission power, for the subsequent transmission period of the target transmitter.

A target transmitter, a target receiver, and a communication method of the target transmitter and the target receive are described herein. The various examples described with reference to FIG. 1 through FIG. 7 may be applied to the target transmitter, the target receiver, and the communication method of the target transmitter and the target receiver, and as such, further descriptions will be omitted.

The units described herein may be implemented using hardware components and software components. For example, base stations, target transmitters, target receivers, processors, transmitting units, and receiving units. A transmitter or receiver may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a target transmitter, the method comprising:
   calculating a target metric, based on a weight of the target transmitter and a transmission rate of the target transmitter, wherein the weight of the target transmitter is set based on a value representing a relative importance of a transmission rate between the target transmitter and a target receiver according to a neighbor metric; and
   adaptively establishing a transmission power, for a subsequent transmission period of the target transmitter, based on a result of comparing an absolute value of a difference between a transmission rate for the subsequent transmission period of the target transmitter and a metric associated with a transmission rate of the target transmitter to a predetermined threshold,
   wherein the transmission rate for the subsequent transmission period of the target transmitter is calculated based on an average of the target metric and a neighbor metric, wherein the neighbor metric is determined with respect to a transmission rate of a neighboring transmitter.

2. The method of claim 1, wherein the determining comprises determining the transmission power, for the subsequent transmission period of the target transmitter, to be substantially the same as a transmission power, for a current transmission period of the target transmitter, in response to an absolute value of a difference between the transmission rate, for the subsequent transmission period of the target transmitter, and the target metric being less than a predetermined threshold.

3. The method of claim 1, wherein the determining comprises determining the transmission power, for the subsequent transmission period of the target transmitter, based on the transmission rate for the subsequent transmission period of the target transmitter, in response to an absolute value of a difference between the transmission rate, for the subsequent transmission period of the target transmitter, and the target metric being greater than or equal to a predetermined threshold.

4. The method of claim 1, further comprising:
   transmitting the target metric to a neighboring transmitter and a neighboring receiver.

5. The method of claim 4, wherein the transmitting comprises transmitting the target metric to the neighboring transmitter through a wired backhaul connected to the neighboring transmitter.

6. The method of claim 4, wherein the transmitting comprises broadcasting the target metric to the neighboring receiver using a radio resource of the target transmitter.

7. The method of claim 1, further comprising:
   receiving the neighbor metric from the neighboring transmitter and the target receiver.

8. The method of claim 1, wherein the determining comprises assigning a radio resource, other than a radio resource of a current transmission period, for the subsequent transmission period, in response to an absolute value of a difference between the transmission rate for the subsequent transmission period of the target transmitter and the target metric being less than a predetermined threshold, in response to the transmission rate for the subsequent transmission period of the target transmitter being less than a requested predetermined transmission rate, and in response to the target transmitter using a substantially maximum transmission power at a current transmission period.

9. The method of claim 1, wherein, in response to the target transmitter corresponding to a relay node of a multi-hop communication system, the neighboring transmitter and the neighboring receiver correspond to a relay node adjacent to the target transmitter.

10. The method of claim 1, wherein, in response to a determination that the target transmitter is using a substantially maximum transmission power at a current transmission period, adaptively assigning a radio resource, other than a radio resource of a current transmission period, for the subsequent transmission period.

11. The method of claim 10, wherein the radio resource comprises a frequency or time resource.

12. A target transmitter, comprising:
   a processor configured to calculate a target metric, based on a weight of the target transmitter and a transmission rate of the target transmitter, wherein the weight of the target transmitter is set based on a value representing a relative importance of a transmission rate between the target transmitter and a target receiver according to a neighbor metric; and
   wherein the processor adaptively establishes a transmission power, for a subsequent transmission period of the target transmitter, based on a result of comparing an absolute value of a difference between a transmission rate for the subsequent transmission period of the target transmitter, and the transmission rate of the target transmitter for the subsequent transmission period is calculated based on an average of the target metric and a neighbor metric, wherein the neighbor metric is determined with respect to a transmission rate of a neighboring transmitter.

13. The target transmitter of claim 12, wherein the processor determines a transmission power, for the subsequent transmission period of the target transmitter, to be the substantially same as a transmission power, for a current transmission period of the target transmitter, in response to an absolute value of a difference between the transmission rate, for the subsequent transmission period of the target transmitter, and the target metric being less than a predetermined threshold.

14. The target transmitter of claim 12, wherein the processor determines a transmission power, for the subsequent transmission period of the target transmitter, based on the transmission rate, for the subsequent transmission period of the target transmitter, in response to an absolute value of a difference between the transmission rate, for the subsequent transmission period of the target transmitter, and the target metric, being greater than or equal to a predetermined threshold.

15. The target transmitter of claim 12, further comprising:
a receiving unit configured to receive a neighbor metric from the neighboring transmitter and the target receiver.

16. The target transmitter of claim 12, wherein, in response to an absolute value of a difference between the transmission rate for the subsequent transmission period of the target transmitter and the target metric being less than a predetermined threshold, in response to the transmission rate for the subsequent transmission period of the target transmitter being less than a requested predetermined transmission rate, and in response to the target transmitter using a substantially maximum transmission power at a current transmission period, the processor assigns a radio resource, other than a radio resource of a current transmission period, for the subsequent transmission period.

17. The target transmitter of claim 12, further comprising a transmitting unit configured to transmit the target metric to a neighboring transmitter and a neighboring receiver.

* * * * *